United States Patent [19]

Yamamoto et al.

[11] Patent Number: 4,714,935

[45] Date of Patent: Dec. 22, 1987

[54] INK-JET HEAD DRIVING CIRCUIT

[75] Inventors: Mitsuru Yamamoto; Nobuaki Sakurada, both of Yokohama; Yoshitaka Watanabe, Tokyo, all of Japan

[73] Assignee: Canon Kabushiki Kaisha, Tokyo, Japan

[21] Appl. No.: 910,818

[22] Filed: Sep. 23, 1986

Related U.S. Application Data

[63] Continuation of Ser. No. 609,803, May 14, 1984, abandoned.

[30] Foreign Application Priority Data

May 18, 1983 [JP] Japan .................................. 58-86952
May 27, 1983 [JP] Japan .................................. 58-93783
Jun. 3, 1983 [JP] Japan .................................. 58-99089

[51] Int. Cl.[4] .............................................. G01D 15/16
[52] U.S. Cl. ................................. 346/140 R; 310/317
[58] Field of Search .......................... 346/140; 310/317

[56] References Cited

U.S. PATENT DOCUMENTS 4,282,535 8/1981 Kern .................................... 346/140
4,284,996 8/1981 Greve .................................. 346/140
4,393,384 7/1983 Kyser .............................. 346/140 X
4,398,204 8/1983 Dietrich ............................. 346/140
4,471,363 9/1984 Hanaoka ............................. 346/140
4,509,059 4/1985 Howkins ......................... 346/140 X
4,521,786 6/1985 Bain .................................... 346/140
4,546,362 10/1985 Koto .................................... 346/140

*Primary Examiner*—Joseph W. Hartary
*Attorney, Agent, or Firm*—Fitzpatrick, Cella, Harper & Scinto

[57] ABSTRACT

An ink-jet head driver comprises: a pressure chamber filled with a recording liquid; a piezo-electric element as electrical/mechanical transducing means for enlarging the capacity of the pressure chamber at a first stage and contracting it in a second stage into the state before enlargement, thereby emitting the recording liquid; and a device for adjusting the time interval between the first and second stages to adjust the emitting velocity. The capacity of the pressure chamber is changed due to charge and discharge by a charging/discharging circuit, and charge/discharge time constants of this circuit are selectively controlled by a control unit. According to this driver, mixture of air into recording liquid in the ink-jet head when the piezo-electric element is expanded is prevented, and a variable range of a dot diameter of the recording liquid droplet can be extended, thereby improving recording quality.

10 Claims, 10 Drawing Figures

INK-JET HEAD DRIVING CIRCUIT

This application is a continuation, of application Ser. No. 609,803 filed May 14, 1984, now abandoned.

BACKGROUND OF THE INVENTION

1. Field of the Invention

The present invention relates to an ink-jet head driving apparatus for driving an ink-jet head and, more particularly, to an ink-jet head driver of the drop-on-demand type.

2. Description of the Prior Art

In ink-jet recording apparatuses, particularly in drop-on-demand type recorders which discharge a recording liquid by contracting a pressure chamber for the recording liquid using an electrical-mechanical transducing element, recording quality is affected by the emitting velocity of the recording liquid. For example, with a low emitting velocity, it is conventionally impossible to discharge the recording liquid in a small dot region.

Ink-jet head drive means in conventional recorders apply a pulse voltage in the direction opposite to the polarization voltage to an electrical/mechanical transducing element, e.g., to a piezoelectric element for allowing a capacity of the pressure chamber to be enlarged, and thereafter it changes this pulse voltage rapidly in the direction of the leading edge and permits the capacity of the pressure chamber to be shifted from the enlarged state to the contracted state, thereby discharging the ink droplet. As methods for increasing the emitting velocity, the following methods have been conventionally adopted: (1) increasing the applied voltage value; (2) quickening the leading edge of the pulse voltage, etc. However, according to these methods, the quantity of recording liquid, e.g., ink will also have increased in association with an increase, in emitting velocity. As a result, this causes a diameter of recording (printing) dot to be enlarged and therefore these methods are not suitable high quality recording.

In addition, such a drive circuit is constituted in the manner such that the piezo-electric element is expanded first by applying the voltage in the direction opposite to the polarization direction to the piezo-electric element and then the piezo-electric element is contracted by applying the voltage in the polarization direction to the piezo-electric element, thereby discharging the recording liquid. Furthermore, no voltage is applied between both electrodes of the piezo-electric element at the next timing for allowing the charges which have been accumulated in the piezo-electric element to be discharged through a switching element, and it is necessary to return to the standby mode. However, in the conventional drive circuit, a time constant of this discharge is small and the discharge is rapidly performed, so that the piezo-electric element is suddenly expanded from the contraction state to the state in that no voltage is applied. Consequently, the meniscus at the orifice of the jet head is rapidly moved backward which can cause air to mix with the ink in the head. This mixture of air causes the discharge of the recording liquid droplet to become unstable.

The conventional ink-jet head drive circuit will now be described in detail with respect to FIGS. 1 and 2.

FIG. 1 shows the conventional ink-jet head drive circuit and pulses (a) and (b) in FIG. 2 show timing pulses for controlling switching elements thereof and a pulse (c) represents a drive waveform for a piezo-electric element of such a drive circuit.

In FIG. 1, switching elements 21 and 23 consist of npn switching transistors; and switching elements 22 and 24 consist of pnp switching transistors. A timing pulse ($\bar{b}$) of which the waveform of the pulse (b) in FIG. 2 was inverted is input to the bases of the transistors 21 and 22, while a timing pulse ($\bar{a}$) of which the waveform of the pulse (a) in FIG. 2 was inverted is input to the bases of the transistors 23 and 24, respectively. The emitter of the transistor 21 is connected to a driving voltage source $V_1$, while the emitter of the transistor 23 is connected to a driving voltage source $V_2$, respectively. Their collectors are connected to variable resistors 25 and 26, respectively. The other ends of the variable resistors 25 and 26 are connected to a positive electrode 28 and a negative electrode 29 of a piezo-electric element 27, respectively. Furthermore, the positive electrode 28 is connected to the collector of the transistor 22 and the negative electrode 29 is connected to the collector of the transistor 24, respectively. The emitters of the transistors 22 and 24 are connected to a reference potential, e.g., to the ground. In the above connection, each switching element is on-off controlled at timings shown in Table 1.

TABLE 1

| Switching elements | $T_1$ | $T_2$ | $T_3$ |
|---|---|---|---|
| 21 | off | on | off |
| 22 | on | off | on |
| 23 | on | off | off |
| 24 | off | on | on |

The operation of the circuit of FIG. 1 will be described. When the switching elements 22 and 23 are turned on at a time $t_1$ in FIG. 2, the positive electrode 28 of the piezo-electric element 27 is grounded, so that the positive driving voltage $V_2$ is applied through the variable resistor 26 to the negative electrode 29. Therefore, the voltage in the direction opposite to the polarization direction is applied to the piezo-electric element 27, causing the piezo-electric element 27 to be expanded and the capacity of the pressure chamber of the jet head to be enlarged. When the switching elements 22 and 23 are then turned off and the elements 21 and 24 are turned on at time $t_2$, the positive driving voltage V is applied through the variable resistor 25 to the positive electrode 28 of the piezo-electric element 27, so that the negative electrode 29 is grounded. Therefore, the voltage in the polarization direction is applied to the piezo-electric element 27, causing the piezo-electric element 27 to be contracted and the capacity of the pressure chamber to be reduced, so that the recording liquid droplet is discharged.

Furthermore, when the switching elements 21 and 23 are turned off and the elements 22 and 24 are turned on at time $t_3$, both electrodes 28 and 29 of the piezo-electric element 27 are grounded, so that the piezo-electric element 27 is expanded from the contracted state at time $t_2$ to the state in that no voltage is applied and the capacity of the pressure chamber is also enlarged more than that at time $t_2$. In this case, although the charges which have been accumulated in the piezo-electric element 27 are discharged through the switching element 22, since no resistor is in particular connected to this discharge circuit and this circuit has accordingly a low resistance, the piezo-electric element 27 rapidly expands and the capacity of the pressure chamber is also rapidly enlarged. Thus, the meniscus at the point of the orifice of the jet head is rapidly moved backward and there is a fear of mixture of air with the ink. This mixture of air causes a drawback such that the discharge of recording liquid droplet becomes unstable.

On the other hand, if a dot diameter of the droplet to be formed on a recording paper is made variable, a picture image with an intermediate gradient can be reproduced; however, in the conventional ink-jet head driver, sufficient tone cannot be always obtained since the available range of dot diameter range is narrow.

SUMMARY OF THE INVENTION

It is a first object of the present invention to eliminate the above-mentioned drawbacks in the conventional liquid-jet recording apparatuses and to provide an ink-jet head driving apparatus which can adjust the emitting velocity of a recording liquid without substantially changing a quantity of recording liquid and a diameter of recording liquid to be emitted, thereby enabling the recording with high quality to be performed.

In detail, an essence of such a driver is that when the ink-jet head is driven, the emitting velocity is adjusted by changing the time interval between the first stage whereby the capacity of the pressure chamber for the recording liquid is enlarged and the second stage whereby it is contracted into the state before enlargement. This ink-jet head driver comprises: a pressure chamber for a recording liquid; means for enlarging the capacity of the pressure chamber at a first stage and contracting the capacity of the pressure chamber into the state before enlargement at a second stage, thereby discharging the recording liquid droplet; and means for adjusting the time interval between the first and second stages.

A second object of the invention is to provide an ink-jet head drive circuit which can prevent the mixture of the air into the liquid-jet head when electrical/mechanical transducing means is expanded.

In detail, this ink-jet head drive circuit comprises: electrical/mechanical transducing means; means for charging the electrical/mechanical transducing means into a first polarity; means for charging the electrical/mechanical transducing means into a second polarity; and means for selectively controlling a time constant for discharge of the electrical/mechanical transducing means.

A third object of the invention is to provide a liquid-jet head driver which can extend a variable range of dot diameter of the recording liquid droplet by a simple constitution, thereby improving recording quality of the driving apparatus of this kind.

In detail, this driver comprises: electrical/mechanical transducing means; first drive means for allowing the electrical/mechanical transducing means to cause a first deformation; second drive means for allowing the electrical/mechanical transducing means to cause a second deformation different from the first deformation; and means for controlling an amount of the second deformation of the electrical/mechanical transducing means by the second drive means.

Other objects, features and advantages of the present invention will become apparent from the following detailed description with reference to the accompanying drawings.

Figure 1:
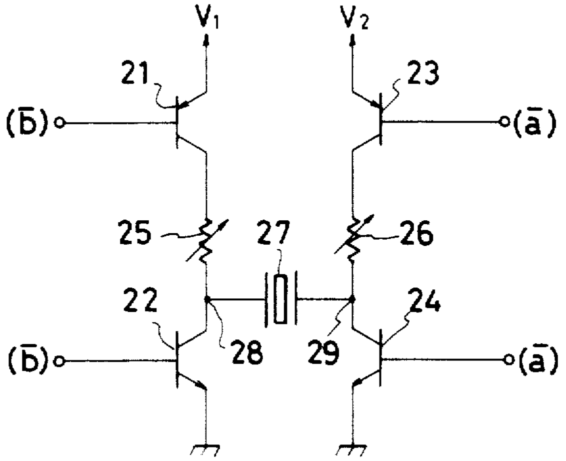
FIG. 1 (Prior art)
FIG. 1 shows a circuit diagram of a conventional ink-jet head drive circuit.
Figure 2:
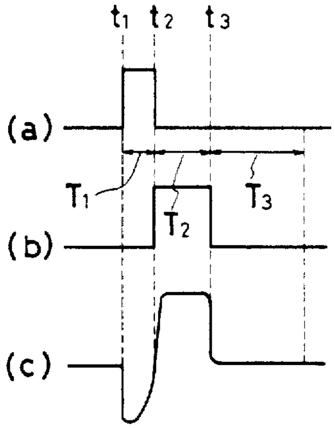
FIG. 2 (Prior art)
FIG. 2 shows a waveform diagram to describe the operation of the circuit of FIG. 1.
Figure 3:
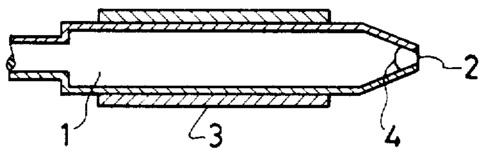
FIG. 3 shows a cross-sectional view of a jet head which is employed in this invention.
Figure 4:
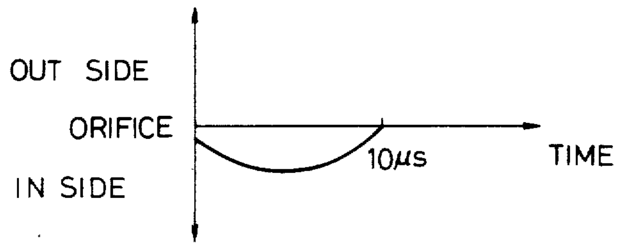
FIG. 4 is a diagram showing the backward state of a meniscus in the jet head of FIG. 3 after the reverse pulse voltage was applied.
Figure 5:
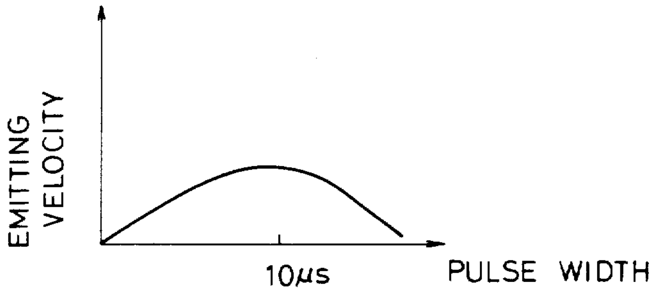
FIG. 5 is a diagram showing the relation between an emitting velocity of the recording liquid droplet and a pulse voltage width.

DETAILED DESCRIPTION OF THE PREFERRED EMBODIMENTS (Principle of an ink-jet head driver as a first embodiment according to the present invention) (FIGS. 3 to 5)

FIG. 3 shows the principal part of an ink-jet head, in which a reference numeral 1 denotes a pressure chamber shown as a nozzle; 2 is an orifice at the point thereof; 3 is a piezo-electric element as an example of an electrical/mechanical transducing element for enlarging or contracting the capacity of the pressure chamber 1; and 4 is a meniscus of a recording liquid. Also, other electrical/mechanical transducing element such as an electro-striction element, magneto-striction element, etc. may be used in addition to the piezo-electric element.

At a first stage of the head driving, when the trailing pulse voltage in the direction opposite to the polarization voltage is applied to the piezo-electric element 3, the capacity of the pressure chamber 1 is enlarged and the meniscus 4 is moved backward from the point of the orifice 2. Thereafter, the meniscus 4 is pulled back due to the surface tension. Therefore, the position of the meniscus 4 changes as shown in FIG. 4 in which the lower portion of the abscissa shows the position of the meniscus 4 relative to the orifice 2 in the pressure chamber 1 as shown in FIG. 3.

At a second stage, when the reverse pulse voltage is raised so as to synchronize with this action of the meniscus 4, the motion of the recording liquid due to a decrease in volume of the pressure chamber 1 and the motion of the same due to the surface tension of the meniscus 4 are multiplicatively enhanced, thereby increasing the emitting velocity of the recording liquid. However if when the applied voltage is raised before the forward movement of the meniscus 4 is started or after the completion of such movement, the motion of the recording liquid due to contraction of the volume of the pressure chamber 1 and the motion due to the surface tension are in opposition thereby decreasing the emitting velocity of the recording liquid.

In this embodiment, for example, by adjusting a pulse width of the applied pulse voltage, the phases between the motion of the recording liquid caused by the surface tension of the meniscus 4 and the motion of the recording liquid caused by the leading edge of the pulse voltage are aligned, thereby maximizing the emitting velocity of the droplet without increasing a quantity of recording liquid to be emitted. FIG. 5 shows the experimental result with respect to the relation between the pulse width of the applied voltage and the emitting velocity (Constitution of a practical example of the ink-jet head driver of the first embodiment) (FIG. 6)

Figure 6:
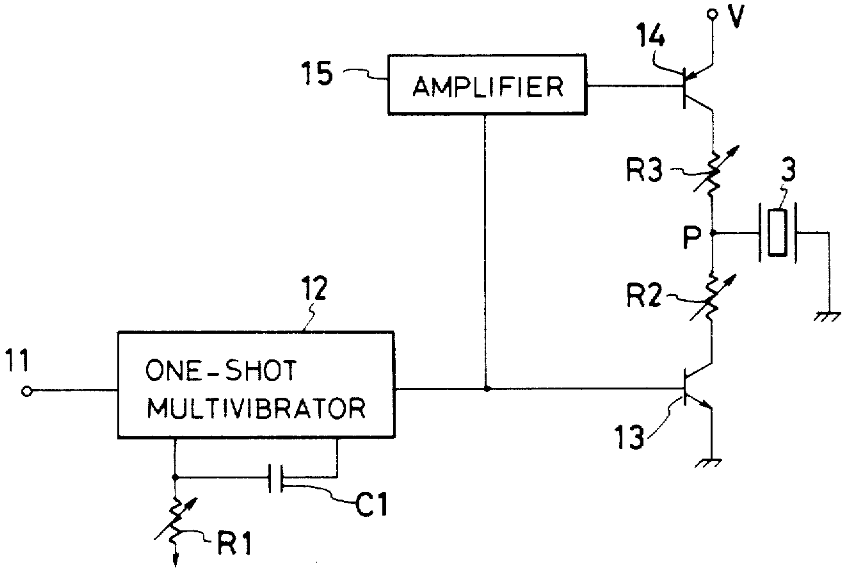
FIG. 6 shows a circuit diagram of a first embodiment of an ink-jet head driver according to the invention.

FIG. 6 shows an example of the circuit for obtaining an output pulse with a variable pulse width to embody the ink-jet head driver, in which a numeral 11 denotes a trigger input terminal; 12 is a one-shot multivibrator IC; and R1 and C1 are a variable resistor and a capacitor which are externally attached. Numerals 13 and 14 are switching elements and in the diagram, as examples, 13 indicates an npn-switching transistor and 14 represents a pnp-switching transistor. The emitter of the transistor 13 is grounded and the collector is connected to a variable resistor R2, while the emitter of the transistor 14 is connected to a positive potential source V and the collector is connected to a variable resistor R3. The other ends of the variable resistors R2 and R3 are connected to a node P. The base of the transistor 13 is directly connected to an output of the one-shot multivibrator 12 and the base of the transistor 14 is connected thereto through an amplifier 15. The positive electrode of the piezo-electric element 3 is grounded and its negative electrode is connected to the node P. In this circuit, a width of the pulse to be generated by the one-shot multivibrator 12 can be adjusted by adjusting the variable resistor R1. In addition to a circuit of R1 and C1 shown, any other time constant circuit may be used as the means to adjust the generated pulse width.

(Operation of the ink-jet head driver of the first embodiment) (FIG. 6)

When no recording liquid is emitted in FIG. 6, the npn-switching transistor 13 is in on-state and the pnp switching transistor 14 is in off-state, so that there is no potential difference between both electrodes of the piezo-electric element 3.

When emitting the recording liquid, the transistor 13 is first turned off and the transistor 14 is turned on. Thus, the voltage in the direction opposite to the polarization direction is applied through the variable resistor R3 to the negative electrode of the piezo-electric element 3, so that the capacity of the pressure chamber 1 of the jet head is enlarged due to this reverse voltage and the meniscus is moved backward into the inside of the pressure chamber 1. Thereafter, although the backward meniscus 4 is recovered into the state before the reverse voltage is applied due to the surface tension of the portion of the orifice 2, by turning on the transistor 13 and turning off the transistor 14 by aligning the phases with the motion of the meniscus 4 due to the surface tension, the reverse voltage which was being applied to the piezo-electric element 3 is removed. Thus, the capacity of the pressure chamber 1 rapidly contracts and returns to the state before the reverse voltage is applied, allowing the recording liquid droplet to be emitted.

As described above, according to the driver shown in FIG. 6, a width of the applied pulse voltage to the piezo-electric element 3 is adjusted by adjusting the variable resistor R1 so that the phases between the motion of the recording liquid due to the decrease in volume of the pressure chamber 1 of the jet head and the motion due to the surface tension of the meniscus 4 coincide. Therefore, the emitting velocity of the droplet can be increased without increasing a quantity of recording liquid to be emitted and this also enables the recording liquid to be emitted in a small dot region.

On one hand, to embody the present invention, as means for adjusting the time interval between the first stage whereby the capacity of the pressure chamber is enlarged and the second stage whereby the capacity of the pressure chamber is contracted into the state before enlargement, it is also possible to adopt the form such that the voltages in the opposite direction to one another at the first and second stages are applied to the electrical/mechanical transducing element such as a piezo-electric element or the like and the time interval therebetween is set by a variable delay circuit, or the form using two outputs of a flip flop circuit, or the like.

As described above in detail, according to the first embodiment of the invention, in the ink-jet head driver, there is provided the means for adjusting the time interval between the first stage whereby the capacity of the pressure chamber of the jet head is enlarged and the second stage whereby the capacity of the pressure chamber is contracted to the state before enlargement and thereby to emit the recording liquid droplet; therefore, the emitting velocity of the recording liquid can be adjusted without substantially changing a quantity and a diameter of the recording liquid to be emitted. Consequently, the emission of the recording liquid in the small dot region, which could not be used conventionally since the emitting velocity is slow, can be used owing to an increase in the emitting velocity, thereby enabling recording (printing) quality to be improved.

(Constitution of an ink-jet head drive circuit as a second embodiment)

Figure 7:
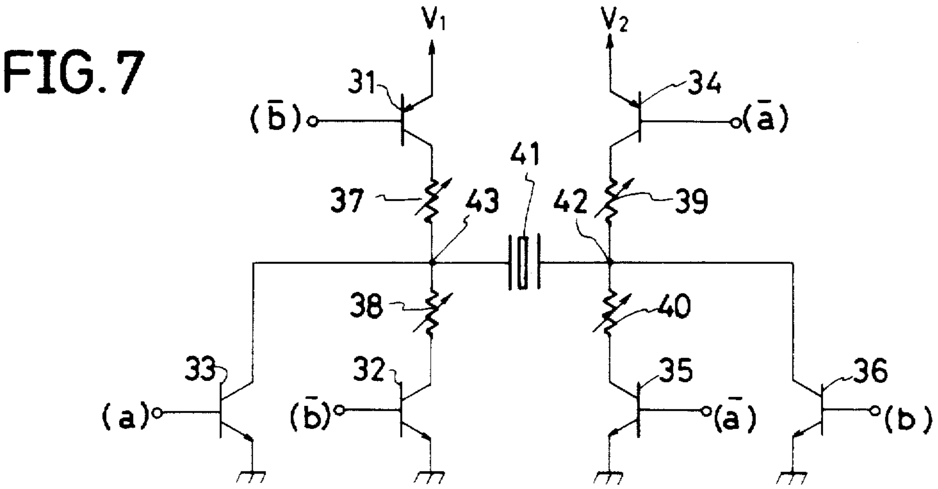
FIG. 7 shows a circuit diagram of a second embodiment of an ink-jet head drive circuit according to the invention.
Figure 8:
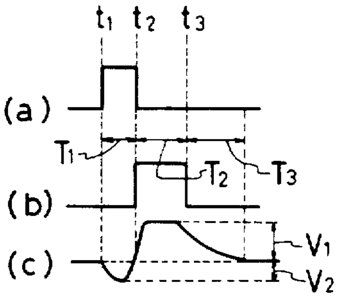
FIG. 8 shows a waveform diagram to explain the operation of the circuit of FIG. 7.

FIG. 7 shows an ink-jet head drive circuit of a second embodiment and FIG. 8 shows the timing pulses (a) and (b) to control the switching elements thereof and the drive waveform (c) for the piezo-electric element.

In FIG. 7, numerals 31 to 36 denote switching elements and among them, 31 and 34 consist of, e.g., pnp-switching transistors, while 32, 33, 35 and 36 consist of, e.g., npn-switching transistors. In addition to the switching elements shown, any other switching elements may be used. The timing pulses (a), ($\bar{a}$), (b) and ($\bar{b}$) are respectively input to the bases of these transistors as shown in FIG. 7. Also, (a) and (b) indicate the timing pulses (a) and (b) in FIG. 8, while ($\bar{a}$) and ($\bar{b}$) represent the waveforms of which (a) and (b) were inverted, respectively.

The driving voltage $V_1$ is supplied to the emitter of the transistor 31 and the driving voltage $V_2$ is supplied to the emitter of the transistor 34, respectively. The collectors of these transistors are connected to variable resistors 37 and 39, respectively. The other ends of the variable resistors 37 and 39 are connected to a positive electrode 43 and a negative electrode 42 of a piezo-electric element 41, respectively. Furthermore, the positive electrode 43 is connected to the collector of the transistor 32 through a variable resistor 38 and is directly connected to the collector of the transistor 33. The negative electrode 42 is connected to the collector of the transistor 35 through a variable resistor 40 and is directly connected to the collector of the transistor 36. The emitters of the transistors 32, 33, 35 and 36 are connected to the reference potential, for instance, to the ground. In the above connection, each switching element is on-off controlled at timings shown in Table 2.

TABLE 2

| Switching elements | $T_1$ | $T_2$ | $T_3$ |
|---|---|---|---|
| 31 | off | on | off |
| 32 | on | off | on |
| 33 | on | off | off |
| 34 | on | off | off |
| 35 | off | on | on |
| 36 | off | on | off |

(Operation of the ink-jet head drive circuit of the second embodiment) (FIGS. 7 and 8)

In the foregoing constitution, when the switching elements 32, 33 and 34 are turned on at the time $t_1$ in FIG. 8, the positive electrode 43 of the piezo-electric element 41 is in the grounded state, so that the positive driving voltage $V_2$ is applied through the variable resistor 39 to the negative electrode 42. Therefore, the piezo-electric element 41 is expanded since it is charged into the first polarity, i.e., into the polarity opposite to the polarization direction, causing the capacity of the pressure chamber of the jet head to be enlarged In this case, since the switching element 33, which does not have a resistor, is on, a time constant for the charge of the piezo-electric element 41 is determined substantially by a resistance value of the variable resistor 39 and a capacitance value of the piezo-electric element 41.

Then, when the switching elements 32, 33 and 34 are turned off and the elements 31, 35 and 36 are turned on at the time $t_2$, the negative electrode 42 of the piezo-electric element 41 is in the grounded state, so that the positive driving voltage $V_1$ is applied through the variable resistor 37 to the positive electrode 43. Therefore, the piezo-electric element 41 is rapidly contracted since it is charged in the polarization direction, causing the capacity of the pressure chamber of the jet head to be contracted, thereby emitting the recording liquid droplet. In this case, since the time constant for the charge by the voltage $V_1$ to the piezo-electric element 41 has to be enough small so as to be adapted to the above-mentioned operation, the switching element 36, which does not have a resistor, is connected in parallel with the switching element 35. In this case, the charges having the opposite polarity which have been accumulated in the interval $T_1$ are discharged at the same time constant as in case of charging due to the positive driving voltage $V_1$ since the resistances of the switching elements 35 and 36 connected in parallel are extremely small.

Furthermore, when the switching elements 32 and 35 are turned on and the other switching elements are turned off at the time $t_3$, both electrodes 42 and 43 of the piezo-electric element 41 are together grounded, so that the piezo-electric element 41 is expanded from the contracted state at the interval $T_2$ to the state in that no voltage is applied, causing the capacity of the pressure chamber to be enlarged. In this case, although the charges accumulated in the piezo electric element 41 are discharged through the switching elements 32 and 35, the time constant for this discharge is determined by resistance values of the variable resistors 38 and 40 and a capacitance value of the piezo-electric element 41 in the circuit of FIG. 7 and this time constant can be set as 100μ sec. or more; therefore, it is possible to prevent the mixture of the air into the jet head due to the rapid expansion of the piezo-electric element 41 as in the conventional apparatus.

If only the switching elements 32 and 35 excluding the switching elements 33 and 36 are connected respectively to both electrodes 43 and 42 of the piezo-electric element 41, only the above-mentioned time constant for the discharge can be set into a desired value. However, the charge time constant of the piezo-electric element 41 by the driving voltages $V_1$ and $V_2$ and the discharge time constant in the interval $T_2$ of the charges accumulated in the piezo-electric element 41 if the interval $T_1$ become large, so that the foregoing arrangement is not adapted to the foregoing expanding and contracting operations of the piezo-electric element 41. In the circuit shown in FIG. 7, it is possible to set the time constant suitable for each given operation by the switching elements 32 and 33, and 35 and 36 which were respectively connected in parallel.

In place of the circuit of FIG. 7, the switching elements 33 and 36 may be omitted and the switching elements 32 and 35 may be connected respectively in parallel with the variable resistors 38 and 40, and by respectively controlling these elements by the timing pulses (a) and (b) in FIG. 8, these resistors may be short-circuited for a predetermined period of time.

As described in detail above, according to the second embodiment, there are provided the means for charging the electrical/mechanical transducing means into the first polarity, the means for charging this into the second polarity, and the means for selectively controlling the discharge time constant of this electrical/mechanical transducing means; therefore, it is possible to perform the operation to emit the recording liquid at a predetermined timing by once expanding the electrical/mechanical transducing means and thereafter by rapidly contracting it. In addition, it is possible to largely set the time constant when discharging after the electrical/mechanical transducing means was charged into the second polarity. As a result, the mixture of the air into the jet head due to the rapid expansion of the electrical/mechanical transducing means can be prevented and the recording liquid can be stably emitted.

(Constitution for variably controlling a quantity of droplet to be emitted in the second embodiment)

Figure 9:
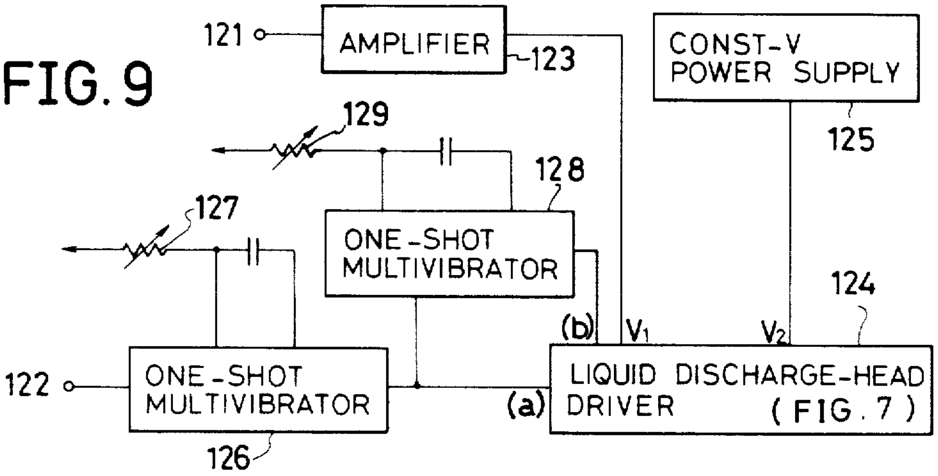
FIG. 9 shows a block diagram of a control unit for the driver of FIG. 7.

FIG. 9 shows an example of a control unit for varying a dot diameter of the recording liquid to be emitted from the jet head by the driver of FIG. 7, in which a numeral 121 denotes an input terminal of a dot diameter instruction signal and 122 represents an input terminal of a trigger pulse to instruct the start of emission. There is a correspondence relation between a voltage value of the dot diameter instruction signal and a quantity of recording liquid to be discharged, i.e., a dot diameter to be recorded. This instruction signal is amplified by an amplifier 123 and is applied as the positive driving voltage $V_1$ to a liquid-discharge head driver 124 which has been described in conjunction with FIG. 7. An output of a constant voltage power supply 125 is applied as the negative driving voltage $V_2$ to the driver 124.

Therefore, the positive driving voltage $V_1$ to be applied to the piezo-electric element (41 in FIG. 7) in the driver 124 is changed in dependence upon a voltage value of the dot diameter instruction signal, so that the dot diameter of the recording liquid to be emitted changes. A value of the positive driving voltage $V_2$ is set at the lowest voltage at which the emission is possible when the voltage $V_1$ is zero.

The trigger pulse to instruct the start of emission is applied to a one-shot multivibrator IC 126 to generate the timing pulse (a) shown in FIG. 8. A pulse width of this timing pulse is adjusted by a variable resistor 127 which is externally attached, thereby maximizing the emitting velocity in the case where the voltage $V_1$ is zero. An output of the multivibrator 126 is supplied as the timing pulse (a) to the driver 124 and is also applied to a one-shot multivibrator IC 128 to generate the timing pulse (b) shown in FIG. 8. This pulse width is also adjusted by a variable resistor 129 which is externally attached. An output of the one-shot multivibrator 128 is given as the timing pulse (b) to the driver 124. As well as the circuit shown, any other time constant circuit may be used to adjust the widths of the pulses to be generated by these one-shot multivibrators.

In the foregoing constitution, the pressure chamber of the jet head is first expanded by applying the voltage $V_2$ in the direction opposite to the polarization direction to the piezo-electric element 41 at the time $t_1$ in FIG. 8, so that the meniscus at the point of the orifice is moved backward into the orifice. The backward meniscus starts to move forward due to the surface tension ordinarily after about 10μ sec. have passed. The width of the timing pulse (pulse (a) shown in FIG. 8) to be generated by the one-shot multivibrator 126 is adjusted to align the phase with the forward movement of the meniscus. Subsequently, by applying the voltage $V_1$ in the same direction as the polarization direction to the piezo-electric element 41 (pulse (c) shown in FIG. 8), the pressure chamber is rapidly compressed, so that the recording liquid droplet is emitted.

In this case, since the force to advance the meniscus due to the surface tension is acting thereon, the necessary emitting velocity can be obtained by a compression amount less than that in the conventional jet head, i.e., by applying a low voltage. Also, since the compression amount is less, it is possible to record by a small recording (as well as a printing) dot diameter.

In addition, if a voltage $V_{max}$ to obtain the maximum dot diameter in the conventional jet head is used as the voltage value $V_1$, a larger dot diameter than in the conventional jet head will be obtained since the force to compress the pressure chamber corresponds to the sum of the voltage value $V_2$ and this $V_{max}$.

Figure 10:
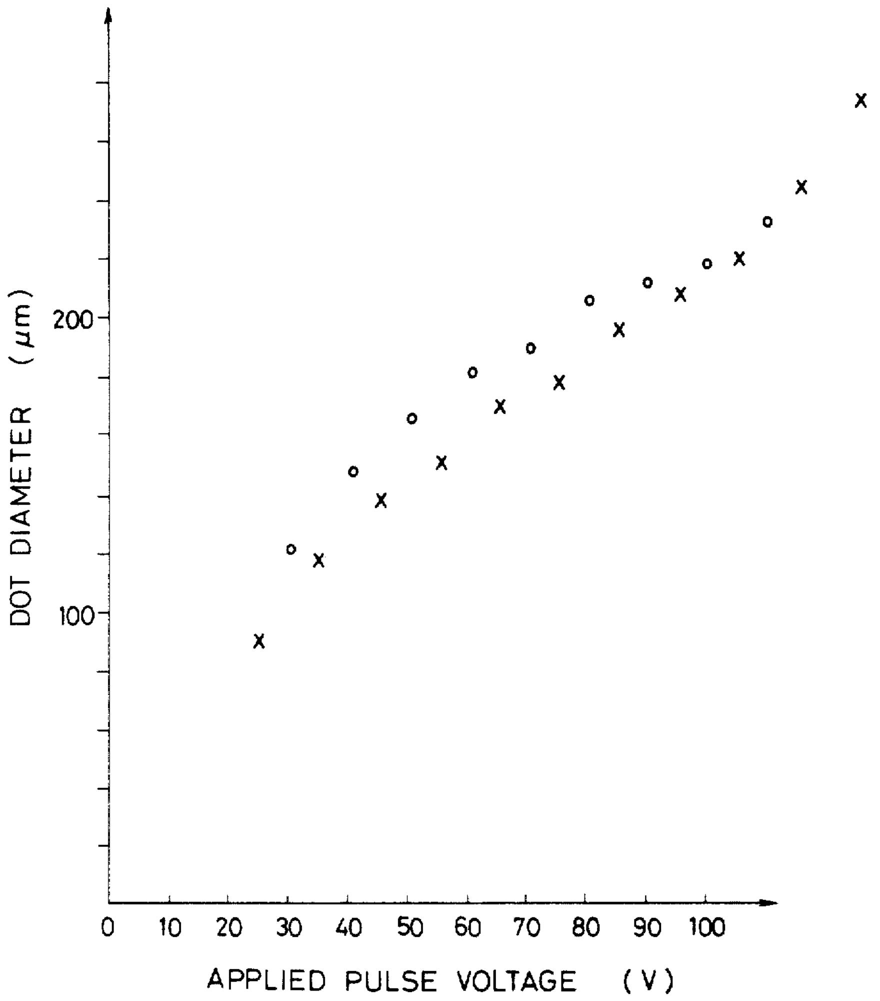
FIG. 10 is a diagram showing variable ranges of a dot diameter of recording liquid droplet in the ink-jet head driver according to the invention and in the conventional driver.

As a result, according to the above driver, the variable range of the dot diameter can be extended more than the conventional one and this enables recording quality to be remarkably improved. FIG. 10 is a plot of the experimental result showing the change of the dot diameter (indicated by a mark x) of the recording droplet to be emitted by the foregoing driver to the applied pulse voltage. It can be seen from this plot that the dot diameter changes in dependence upon the voltage value of the applied pulse voltage and that variable ranges in both ranges where the dot diameter is small and where it is large are extended as compared with that by the conventional apparatus (indicated by a mark o).

On the other hand, although only the voltage $V_1$ is variable in this embodiment, only the voltage $V_2$ may be also made variable. However, the voltage $V_2$ of a large value will result in deterioration in quality since the meniscus is rapidly moved backward and the air is mixed into the ink and the air bubbles will have been generated. Therefore, it is desirable also to vary the voltage $v_1$ even in when variably controlling the voltage $V_2$. In particular, if only the voltage $V_1$ is made variable as in this embodiment, the circuit constitution can be remarkably simplified.

In this way, according to this embodiment, there are provided first drive means for allowing the electrical/mechanical transducing means to cause first deformation, the second drive means for allowing it to cause the second deformation different from the first deformation, and means for controlling an amount of the second deformation by the second drive means; therefore, the deformation corresponding to the sum of the driving forces by first and second drive means can be transferred to the electrical/mechanical transducing means. The variable range of the dot diameter of the recording liquid droplet to be emitted from the jet head can be extended more than that by the conventional apparatus. As a result, recording quality can be improved.

In addition, although the piezo-electric element has been used as the electrical/mechanical transducing means in the foregoing first and second embodiments, such means is intended to incorporate all of means for performing the mutual transduction between the electrical signal and the mechanical deformation, such as electro-striction element, magneto-striction element, etc.

Furthermore, the above embodiments of the invention do not limit the scope of the invention, but it will be appreciated that many modifications and variations of the present invention are possible in light of the above teachings and within the purview of the appended claims without departing from the spirit and intended scope of the invention.

What is claimed is:

1. An ink-jet head driving circuit comprising:

a pressure chamber adapted to be filled with a recording liquid;

a piezo-electric element having a polarization direction for emitting recording liquid by deforming said pressure chamber due to the charge and discharge of said piezo-electric element;

first charging means for charging said piezo-electric element with a voltage of a first level at a first polarity opposed to the polarization direction of said piezo-electric element;

second charging means for charging said piezo-electric element with a voltage of a second level at a second polarity which is different from said first polarity, said second charging means deforming said pressure chamber by charging said piezo-electric element at said second polarity so as to emit recording liquid, said second polarity being the polarization direction of said piezo-electric element;

voltage applying means for applying a voltage of said first level to said piezo-electric element through said first charging means, and for applying a voltage of said second level to said piezo-electric element through said second charging means, said voltage applying means comprising adjusting means for adjusting at least one of said first-level voltage and said second-level voltage;

first means for adjusting the time width during which said first-level voltage is applied by said voltage applying means;

second means for adjusting the time width during which said second-level voltage is applied by said voltage applying means; and discharging means for controlling a discharge time constant of said piezo-electric element, wherein said discharging means includes a discharge path having a resistor therein.

2. An ink-jet head driving circuit according to claim 1, wherein said discharging means sets said discharge time constant to be longer than charge time constants of said first and second charging means.

3. An ink-jet head driving circuit according to claim 1, wherein said first charging means has a first charging path and first and second switching means for closing said first charging path, and said second charging means has a second charging path and third and fourth switching means for closing said second charging path.

4. An ink jet head driving circuit according to claim 3, wherein said discharging path is different from said first and second charging paths.

5. An ink-jet head driving circuit according to claim 4, wherein said resistor is a variable resistor.

6. An ink-jet head driving circuit according to claim 3, further having fifth and sixth switching means in said different discharging path.

7. An ink-jet head driving circuit according to claim 1, wherein said piezo-electric element enlarge the capacity of said pressure chamber due to the charge of said first charging means and reduces the capacity of said pressure chamber due to the charge of said second charging means.

8. An ink-jet head driving circuit comprising:

a pressure chamber adapted to be filled with a recording liquid;

electrical/mechanical transducing means having a polarization direction for deforming said pressure chamber;

first driving means for applying a voltage with a first polarity, opposite to the polarization direction of said electrical/mechanical transducing means, to said electrical/mechanical transducing means such that said transducing means is deformed in a first direction, the capacity of said pressure chamber being enlarged due to said deformation by said first driving means;

second driving means for applying a voltage with a second polarity, which is different from said first polarity and is the polarization direction of said electrical/mechanical transducing means, to said electrical/mechanical transducing means such that said transducing means is deformed in a second direction, said capacity being reduced due to the deformation by said second driving means, and the recording liquid being emitted due to the reduction of the capacity of said pressure chamber;

first adjusting means for adjusting at least one of the levels of the voltages applied to said electrical/mechanical transducing means;

second adjusting means for adjusting time widths during which the voltages are respectively applied to said electrical/mechanical transducing means; and control means for controlling a discharge time constant of said electrical/mechanical transducing means, wherein said control means includes a discharge path having a resistor therein.

9. An ink-jet head driving circuit according to claim 8, wherein said second driving means is made operative subsequent to the operation of said first driving means.

10. An ink-jet head driving circuit according to claim 8, wherein said electrical/mechanical transducing means includes a piezo-electric element.

* * * * *

UNITED STATES PATENT AND TRADEMARK OFFICE
CERTIFICATE OF CORRECTION

PATENT NO. : 4,714,935

DATED : December 22, 1987

INVENTOR(S) : MITSURU YAMAMOTO, ET AL.

It is certified that error appears in the above-identified patent and that said Letters Patent is hereby corrected as shown below:

COLUMN 1

Line 36, "ink" should read --ink,--.
Line 37, "increase," should read --increase--.
Line 40, "suitable high" should read --suitable for high--.
Line 60, "backward" should read --backward,--.

COLUMN 3

Line 11, "range of" should be deleted.

COLUMN 4

Line 64, "However if when" should read --However, if--.

COLUMN 5

Line 1, "opposition" should read --opposition,--.
Line 12, "velocity" should read --velocity.--.
Line 46, "pnp" should read --pnp- --.

COLUMN 7

Line 48, "enough small" should read --small enough--.
Line 65, "piezo electric" should read --piezo-electric--.

COLUMN 8

Line 15, "if" should read --in--.

UNITED STATES PATENT AND TRADEMARK OFFICE
CERTIFICATE OF CORRECTION

PATENT NO. : 4,714,935

DATED : December 22, 1987

INVENTOR(S) : MITSURU YAMAMOTO, ET AL.

It is certified that error appears in the above-identified patent and that said Letters Patent is hereby corrected as shown below:

COLUMN 10

Line 3, "$v_1$" should read --$V_1$--.
Line 3, "in" should be deleted.
Line 9, "cause first" should read --cause the first--.
Line 10, "the" (first occurrence) should be deleted.

COLUMN 11

Line 20, "ink jet" should read --ink-jet--.
Line 31, "enlarge" should read --enlarges--.

Signed and Sealed this

Twenty-first Day of June, 1988

Attest:

DONALD J. QUIGG

Attesting Officer

Commissioner of Patents and Trademarks